(12) United States Patent
He

(10) Patent No.: US 12,633,163 B2
(45) Date of Patent: May 19, 2026

(54) EXPRESSION TRANSFORMATION METHOD AND APPARATUS, ELECTRONIC DEVICE, AND COMPUTER READABLE MEDIUM

(71) Applicant: BEIJING BYTEDANCE NETWORK TECHNOLOGY CO., LTD., Beijing (CN)

(72) Inventor: Qian He, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 390 days.

(21) Appl. No.: 18/042,149

(22) PCT Filed: Aug. 18, 2021

(86) PCT No.: PCT/CN2021/113208
§ 371 (c)(1),
(2) Date: Feb. 17, 2023

(87) PCT Pub. No.: WO2022/037602
PCT Pub. Date: Feb. 24, 2022

(65) Prior Publication Data
US 2023/0326248 A1     Oct. 12, 2023

(30) Foreign Application Priority Data
Aug. 19, 2020    (CN) ........................ 202010837052.X

(51) Int. Cl.
*G06T 11/00*          (2026.01)
*G06V 10/774*         (2022.01)
(Continued)

(52) U.S. Cl.
CPC ............ *G06V 40/174* (2022.01); *G06T 11/00* (2013.01); *G06V 10/7747* (2022.01); *G06V 10/778* (2022.01)

(58) Field of Classification Search
CPC ............ G06V 40/174; G06V 10/7747; G06V 10/778; G06V 40/161; G06T 11/00; G06T 3/04; G06F 18/214
See application file for complete search history.

(56) References Cited

U.S. PATENT DOCUMENTS

| | | | |
|---|---|---|---|
| 2007/0189627 A1* | 8/2007 | Cohen | G06V 40/161 |
| | | | 382/254 |
| 2013/0044958 A1* | 2/2013 | Brandt | G06V 40/165 |
| | | | 382/201 |
| 2022/0301348 A1* | 9/2022 | Bradley | G06T 17/20 |

FOREIGN PATENT DOCUMENTS

| | | |
|---|---|---|
| CN | 107368810 A | 11/2017 |
| CN | 108958610 A | 12/2018 |

(Continued)

OTHER PUBLICATIONS

Jiang, J., Ma, J., Chen, C., Jiang, X., & Wang, Z. (2017). Noise robust face image super-resolution through smooth sparse representation. IEEE Transactions on Cybernetics, 47(11), 3991-4002. https://doi.org/10.1109/tcyb.2016.2594184 (Year: 2017).*

(Continued)

*Primary Examiner* — John Villecco
*Assistant Examiner* — Kyla Guan-Ping Tiao Allen
(74) *Attorney, Agent, or Firm* — BakerHostetler

(57)                  ABSTRACT

An expression transformation method and apparatus, an electronic device, and a computer readable medium. The method comprises: acquiring a target face image (201); and inputting the target face image into a pre-trained expression transformation model to obtain an expression transformation image (202). The expression transformation model performs expression transformation on the target face image to achieve different expression transformation effects. A set of face images which are locally processed and have preset expressions displayed are used for training, so that the effect (Continued)

of the additional special effect can be achieved for the expression transformation image on the basis of transformation.

17 Claims, 5 Drawing Sheets

(51) Int. Cl.
  *G06V 10/778* (2022.01)
  *G06V 40/16* (2022.01)

(56) References Cited

FOREIGN PATENT DOCUMENTS

| | | | | |
|---|---|---|---|---|
| CN | 109064393 | A | | 12/2018 |
| CN | 109859295 | A | | 6/2019 |
| CN | 110349232 | A | * | 10/2019 |
| CN | 110490164 | A | | 11/2019 |
| CN | 110503601 | A | | 11/2019 |
| CN | 110689480 | A | * | 1/2020 ........... G06K 9/6247 |
| CN | 111028305 | A | | 4/2020 |
| CN | 111179156 | A | | 5/2020 |
| CN | 111191564 | A | | 5/2020 |
| CN | 111243066 | A | | 6/2020 |
| CN | 111428572 | A | | 7/2020 |
| CN | 111968029 | A | | 11/2020 |
| CN | 117094893 | A | * | 11/2023 ........... G06T 3/4053 |

OTHER PUBLICATIONS

Vahadane, A., Kumar, N., & Sethi, A. (2016). Learning based super-resolution of histological images. 2016 IEEE 13th International Symposium on Biomedical Imaging (ISBI), 816-819. https://doi.org/10.1109/isbi.2016.7493391 (Year: 2016).*

Written Opinion for International Application No. PCT/CN2021/113208, mailed Nov. 17, 2021, 8 Pages.

International Patent Application No. PCT/CN2021/113208; Int'l Search Report; dated Nov. 17, 2021; 2 pages.

European Patent Application No. 21857694.0; Extended Search Report; dated Jan. 3, 2024; 9 pages.

Choi et al.; "StarGAN: Unified Generative Adversarial Networks for Multi-Domain Image-to-Image Translation"; IEEE/CVF Conf. on Computer Vision and Pattern Recognition; 2018; p. 8789-8797.

Lee et al.; "Facial Expression Transformations for Expression-Invariant Face Recognition"; Advances in Visual Computing Lecture Notes in Computer Science; 2006; p. 323-333.

* cited by examiner

<u>300</u>

301

Obtain a target face image

302

Obtain an expression transformation image in response to inputting the target face image into a pre-trained expression transformation network <u>400</u>

401

Obtain a target face image

402

Obtain an expression transformation image in response to inputting the target face image into a pre-trained expression transformation grid

500

Obtain a target face image ⟶ 501

Obtain an expression transformation image in response to inputting the target face image into a pre-trained expression transformation model ⟶ 502

Perform masking processing on a target region of the expression transformation image ⟶ 503

600

Obtaining unit

First input unit 601                                              602

EXPRESSION TRANSFORMATION METHOD AND APPARATUS, ELECTRONIC DEVICE, AND COMPUTER READABLE MEDIUM

CROSS-REFERENCE

This application is the U.S. National Stage of International Application No. PCT/CN2021/113208, filed on Aug. 18, 2021, which was filed based on the Chinese patent application No. 202010837052.X with a filing date of Aug. 19, 2020, and a title of "EXPRESSION TRANSFORMATION METHOD AND APPARATUS, ELECTRONIC DEVICE, AND COMPUTER READABLE MEDIUM", and claims priority to the Chinese Patent Application, both of which are incorporated herein by reference in their entireties.

FIELD

Embodiments of the present disclosure relate to the technical field of computers, in particular to an expression transformation method and apparatus, an electronic device, and a computer readable medium.

BACKGROUND

With development of the Internet and popularization of an artificial intelligence technology with deep learning as a core, a computer vision technology is applied to various fields of people's daily life, and more and more application software has been applied to people's daily life, some of which can realize effects such as special effect transformation but have a defect of poor expression transformation effect.

SUMMARY

The contents section of this disclosure is used to present ideas in a brief form that will be described in detail later in the specific embodiments section. The content portion of the present disclosure is not intended to identify key features or essential features of the technical solutions claimed to be protected, nor is it intended to be used to limit the scope of the technical solutions claimed to be protected. Some embodiments of the present disclosure present expression transformation methods, devices, electronic devices, and computer readable media to solve the technical problems mentioned in the background technology section above.

In a first aspect, some embodiments of the present disclosure provide an expression transformation method, comprising: obtaining a target face image; and inputting the target face image into a preset expression transformation model to obtain an expression transformation image, wherein the expression transformation model is obtained through training by using an original face image set and an image set subjected to local processing and displaying preset expressions.

In a second aspect, some embodiments of the present disclosure provide an expression transformation apparatus, comprising: an obtaining unit, configured to obtain a target face image; and a first input unit, configured to input the target face image into a preset expression transformation model to obtain an expression transformation image, wherein the expression transformation model is obtained through training by using an original face image set and an image set subjected to local processing and displaying preset expressions.

In a third aspect, some embodiments of the present disclosure provide an electronic device, comprising: one or more processors; and a storage apparatus, storing one or more programs, wherein the one or more programs, when executed by the one or more processors, cause the one or more processors to implement the method as described in any of the implementations of the first aspect.

In a fourth aspect, some embodiments of the present disclosure provide a computer readable medium, storing a computer program, wherein the program, when executed by a processor, implements the method as described in any of the implementations of the first aspect.

One of the above various embodiments of the present disclosure has the following beneficial effects: obtaining a target face image; and inputting the above target face image into a preset expression transformation model to obtain an expression transformation image. The above expression transformation model performs expression transformation on the target face image, and then different effects of expression transformation are realized. For example, a smiling face special effect transformation (a normal face image is transformed into a corresponding smiling face special effect image) may be performed. Besides, a face image set subjected to local processing and displaying preset expressions is used for training, so an effect of adding special effects to expression transformation images can be realized on the basis of transformation.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended markings indicate identical or similar elements. It should be understood that the accompanying drawings are schematic and that the originals and elements are not necessarily drawn to scale.

DETAILED DESCRIPTION OF THE EMBODIMENTS

Embodiments of the present disclosure will be described in greater detail below with reference to the accompanying drawings. While certain embodiments of the present disclosure are shown in the accompanying drawings, it should be understood, however, that the present disclosure may be implemented in various forms and should not be construed as limited to the embodiments set forth herein. Rather, these embodiments are provided for a more thorough and complete understanding of the present disclosure. It should be understood that the accompanying drawings and embodiments of the present disclosure are for exemplary purposes only and are not intended to limit the scope of protection of the present disclosure.

It is also to be noted that, for ease of description, only those portions of the accompanying drawings that relate to the invention in question are shown. The embodiments and the features in the embodiments of the present disclosure may be combined with each other in the absence of conflict.

Note that the concepts "first", "second", etc., referred to in this disclosure are used only to distinguish between different devices, modules or units, and are not intended to limit the order or interdependence of the functions performed by these devices, modules or units.

It should be noted that the modifications of "one" and "more than one" mentioned in this disclosure are schematic and not limiting, and it should be understood by those skilled in the art that unless the context clearly indicates otherwise, they should be understood as "one or more" unless the context clearly indicates otherwise.

The names of the messages or information interacting between the plurality of devices in this disclosure are for illustrative purposes only and are not intended to limit the scope of those messages or information.

The present disclosure will be described in detail below with reference to the accompanying drawings and in conjunction with embodiments.

Figure 1:
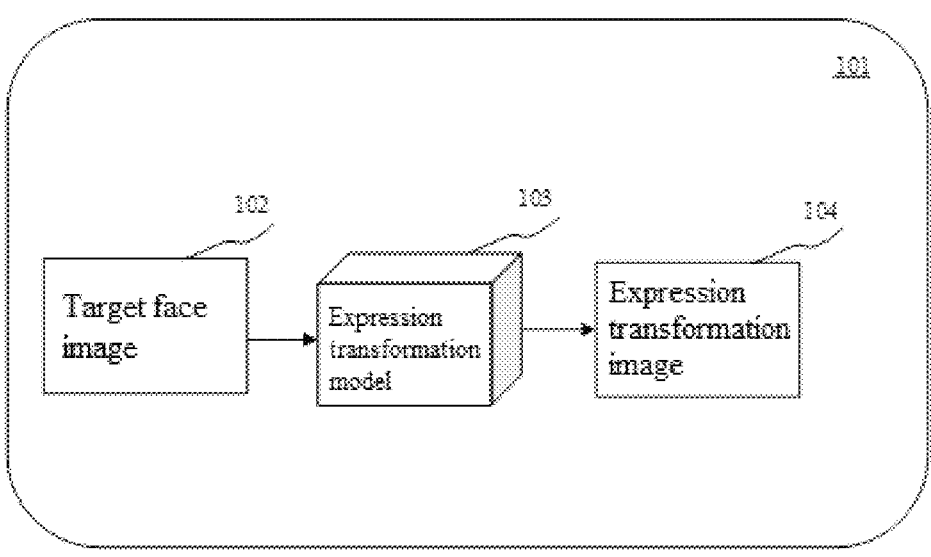
FIG. 1 is a schematic diagram of an application scenario of an expression transformation method according to some embodiments of the present disclosure.

FIG. 1 is a schematic diagram of an application scenario of an expression transformation method according to some embodiments of the present disclosure.

As shown in FIG. 1, a computing device 101 inputs an obtained target face image 102 (for example, a picture containing a user face) into an expression transformation model 103 (for example, a generative adversarial network) to obtain an expression transformation image 104 (a user face picture with a smiling face expression transformation).

It needs to be noted that the above computing device 101 may be hardware, and may also be software. The computing device, when being the hardware, may be implemented as a distributed cluster composed of a plurality of servers or terminal devices, or may also be implemented as a single server or a single terminal device. The computing device, when embodied as the software, may be installed in the above listed hardware devices. The computing device may be implemented as, for example, a plurality of software or a plurality of software modules for providing a distributed service, or may also be implemented as single software or a single software module, which is not specifically limited here.

It should be understood that the quantity of the terminal devices in FIG. 1 is merely an example. There may be any quantity of terminal devices according to implementation demands.

Figure 2:
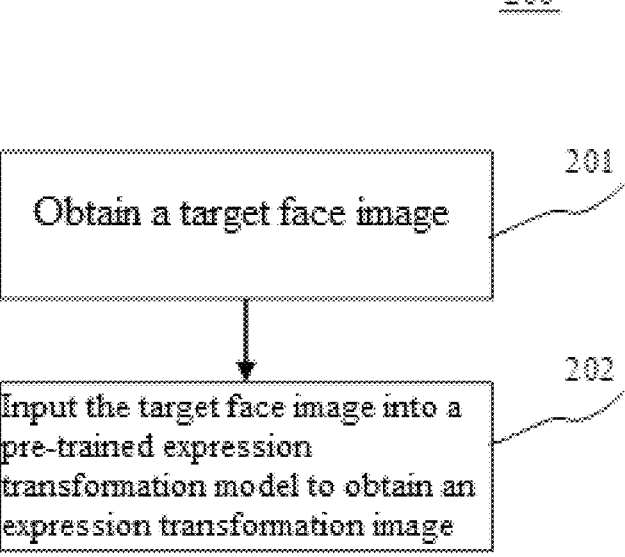
FIG. 2 is a flowchart of some embodiments of an expression transformation method according to the present disclosure.

Continue to refer to FIG. 2, which shows a flow 200 of some embodiments of an expression transformation method according to the present disclosure. The expression transformation method includes the following steps:

step 201, a target face image is obtained.

In some embodiments, an executive body (for example, the computing device shown in FIG. 1) of the expression transformation method may obtain the target face image in a wired connection mode or a wireless connection mode. The above target face image may be a face image of any type. As an example, the executive body of the above method may obtain a user face image in a Bluetooth mode after being authorized.

Step 202, the above target face image is input into the preset expression transformation model to obtain the expression transformation image.

In some embodiments, based on the target face image obtained in step 201, the above target face image may be input by the executive body into a pre-trained expression transformation model to obtain the expression transformation image. The above expression transformation image may be a face image containing an expression special effect, for example, may be a smiling face image of a normal person whose teeth have been whitened.

In some optional implementations of some embodiments, the above preset expression transformation model includes any one of the following items: an expression transformation network and an expression transformation grid.

In optional implementations of some embodiments, the above face image displaying a preset expression is obtained through the following step: an original face image is input into a pre-trained second generative adversarial network to obtain the above face image displaying the preset expression.

An embodiment in various above embodiments of the present disclosure has the following beneficial effects: the target face image is obtained; and the above target face image is input into the preset expression transformation model to obtain the expression transformation image. The above expression transformation model performs expression transformation on the target face image, and then different effects of expression transformation are realized. For example, smiling face special effect transformation (a normal face image is transformed into a corresponding smiling face special effect image) may be performed. Besides, a face image set subjected to local processing and displaying preset expressions is used for training, so an effect of adding special effects to expression transformation images can be realized on the basis of transformation.

Figure 3:
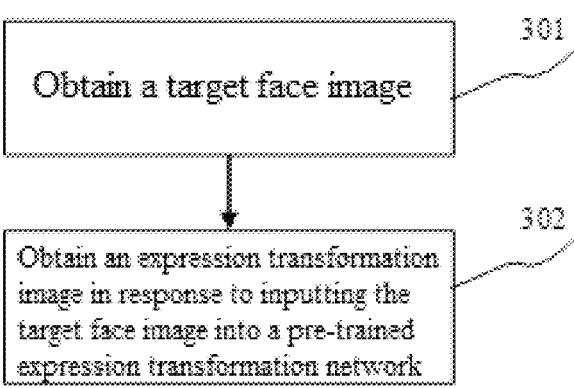
FIG. 3 is a flowchart of some other embodiments of an expression transformation method according to the present disclosure.

Further refer to FIG. 3, which shows a flow 300 of some other embodiments of an expression transformation method. The flow 300 of the expression transformation method includes the following steps:

step 301, the target face image is obtained.

In some embodiments, the executive body of the expression transformation method may obtain the target face image in a wired connection mode or a wireless connection mode.

The above target face image may be a face image of any type. For example, the executive body of the above method may obtain a user face image in a Bluetooth mode.

Step 302, the expression transformation image is obtained in response to inputting the above target face image into a pre-trained expression transformation network. The above expression transformation network is obtained through training by using an original face image set and the face image set subjected to local processing and displaying the preset expressions.

In some embodiments, based on the face image obtained in step 301, the above executive body may input the above target face image into the pre-trained expression transformation network to obtain the expression transformation image. The above expression transformation image may be a face image containing an expression special effect, for example, may be a smiling face image of a normal person with a special effect such as whitening teeth. The above expression transformation network may be obtained through training by using the original face image set and the face image set subjected to local processing and displaying the preset expressions. The above expression transformation network may be a generative adversarial network, and may also be any other neural network capable of generating an image. The above original face image set may be any face image set, and the face image set is open-source valid. The above face image set subjected to local processing and displaying the preset expressions may be any face image set with expressions and is obtained by performing local processing on each expression image. The above local processing may be an image super-resolution processing algorithm, and may also be local whitening super-resolution processing.

For example, the user face image is input into the above generative adversarial network to generate a user face image with special effects such as beaming, whitened teeth and black hair. In optional implementations of some embodiments, the above expression transformation network is obtained through training in the following step: the above original face image set and the face image set subjected to local processing and displaying the preset expressions are obtained. The above original face image set and the above face image set displaying the preset expressions are input into a preset first generative adversarial network for training to generate the above expression transformation network.

For example, there are many original face images of any female user, the above original face images of the female user constitute the original face image set, there are many face images subjected to local processing and having a smiling face of the female user, the above face images with the smiling face of the female user are subjected to local processing, and thus the face image set subjected to local processing and displaying the preset expressions is obtained. The above original face image set and the above face image set subjected to local processing and displaying the preset expressions are input into a generator and a discriminator of the preset generative adversarial network for training, and when the discriminator in the above generative adversarial network reaches an optimal value, that is, when Jensen-Shannon (JS) divergence between data distribution of images generated by the generator and data distribution of the above face images subjected to local processing and displaying the preset expressions is 0, the above two data distributions are consistent. The training for the above expression transformation network is completed.

In optional implementations of some embodiments, the above face images subjected to local processing and displaying the preset expressions are obtained through the following step: the face images displaying the preset expressions are subjected to local processing to obtain the above face images subjected to local processing and displaying the preset expressions.

For example, teeth of a face image of a male user with a smiling face expression are subjected to super-resolution processing to obtain the above face image of the male user subjected to local processing and having expression transformation.

An embodiment in various above embodiments of the present disclosure has the following beneficial effects: the target face image is obtained; the expression transformation image is obtained in response to inputting the above target face image into the pre-trained expression transformation network, wherein the above expression transformation network is obtained through training by using the original face image set and the face image set subjected to local processing and displaying the preset expressions; and the above expression transformation network performs expression transformation on the target face image. Different effects may be realized according to actual demands. For example, a smiling face special effect (a normal face image is transformed into a corresponding smiling face special effect image) may be performed. Besides, the face image set subjected to local processing and displaying the preset expressions is used for training, so the effect of adding special effects to the expression transformation images can be realized on the basis of transformation.

Figure 4:
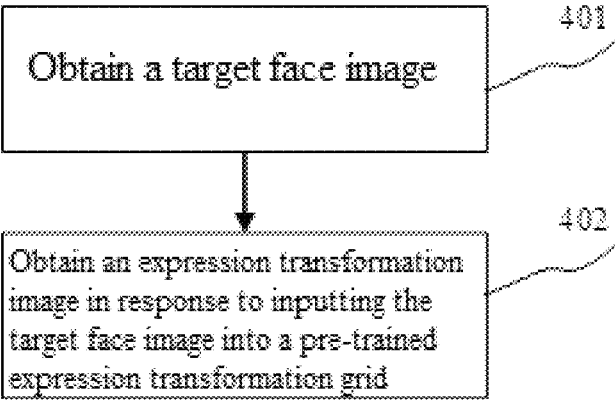
FIG. 4 is a flowchart of some other embodiments of an expression transformation method according to the present disclosure.

Further refer to FIG. 4, which shows a flow 400 of some other embodiments of the expression transformation method. The flow 400 of the expression transformation method includes the following steps:

step 401, the target face image is obtained.

In some embodiments, the executive body of the expression transformation method may obtain the target face image in the wired connection mode or the wireless connection mode. The above target face image may be a face image of any type. For example, the executive body of the above method may obtain a face image of an adult in a network download mode.

Step 402, the expression transformation image is obtained in response to inputting the above target face image into the preset expression transformation network. The above expression transformation image is obtained through the original face image set and an original face image set subjected to local processing and displaying the preset expressions.

In some embodiments, based on the target face images obtained in step 401, the above executive body may input the above target face image into the pre-trained expression transformation network to obtain the expression transformation image. The above expression transformation network is obtained through the original face image set and the original face image set subjected to local processing and displaying the preset expressions. The above original face image set may be any face image set, and the above original face image set subjected to local processing and displaying the preset expressions may be images obtained by performing local processing such as whitening teeth on a smiling face image corresponding to each original face image in the above original face image set.

In some optional implementations of some embodiments, the above preset expression transformation grid may be obtained through the following steps: the above original face image set is obtained; local processing is performed on each original face image displaying the preset expression of the above original face image set to obtain the original face image set subjected to local processing and displaying the preset expressions; the above original face image set and the original face image set subjected to local processing and displaying the preset expressions are stored in preset grids to obtain expression transformation grids, wherein the above expression transformation grids can represent a one-to-one corresponding relation between the original face images and the expression transformation images corresponding thereto.

For example, there are many original face images of any female user, the above original face images of the female user constitute the original face image set, processing of whitening teeth is performed on corresponding smiling face images of the above original face images of the female user to obtain female user images subjected to local processing and displaying a smiling face special effect, and then a smiling face image set (namely, the original face image set subjected to local processing and displaying the preset expressions) corresponding to the above original face images is generated. The above original face image set and the original face image set subjected to local processing and displaying the preset expressions are stored in preset grids to generate the expression transformation grids. When the smiling face image in one-to-one correspondence with each original face image of the female user may be inquired in the above expression transformation grids, the above generation process of the expression transformation grids is completed.

An embodiment in various above embodiments of the present disclosure has the following beneficial effects: the target face image is obtained; the expression transformation image is obtained in response to inputting the above target face image into the pre-trained expression transformation network, wherein the above expression transformation network is obtained through training by using the original face image set and the face image set subjected to local processing and displaying the preset expressions; and the above expression transformation network performs expression transformation on the target face image. Different effects may be realized according to actual demands. For example, a crying face special effect (a normal face image is transformed into a corresponding crying face special effect image) may be performed. Besides, the face image set subjected to local processing and displaying the preset expressions is used for training, so the effect of adding special effects to the expression transformation images can be realized on the basis of transformation.

Figure 5:
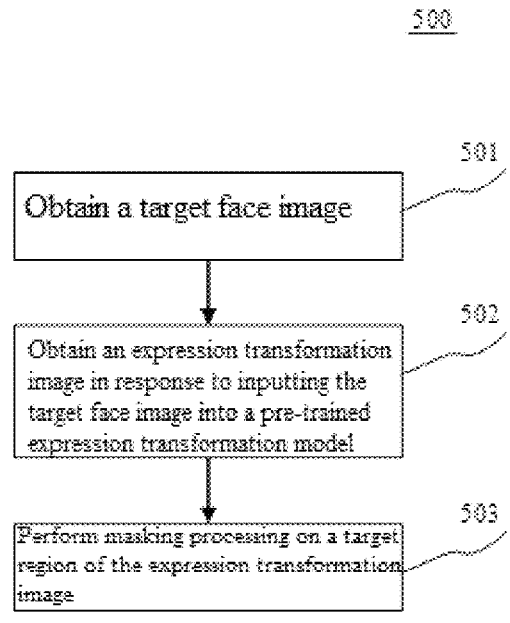
FIG. 5 is a flowchart of some other embodiments of an expression transformation method according to the present disclosure.

Further refer to FIG. 5, which shows a flow 500 of some other embodiments of the expression transformation method. The flow 500 of the expression transformation method includes the following steps.

Step 501, the target face image is obtained.

Step 502, the above target face image is input into the preset expression transformation model to obtain the expression transformation image.

In some embodiments, specific implementations of step 501 to step 502 and brought technical effects may refer to step 201 to step 202 in those corresponding embodiments in FIG. 2 and are not repeated here.

Step 503, masking processing is performed on a target region of the above expression transformation image.

In some embodiments, the executive body of the above method may perform masking processing on the target region of the above expression transformation image. The above target region may be any region of the above expression transformation image. The above masking processing is a method for defining a non-transparent region of a pattern layer.

For example, in order to guarantee an accuracy and quality of a special effect, the above executive body determines a masking picture of a face image, and three color channels of red, green and blue of the picture correspond to Mask1 of face organs (eyes, eyebrows, nose, mouth and the like) regions, Mask2 of a nasolabial folds region and an eye bag region, and Mask3 of a face highlight and low light region respectively. Combining with the masking picture through face key point information, the face Mask corresponding to the current face is generated in real time by a method of triangulation, and fusion processing is performed on an image after smoothing and an original image. Mask1 may protect each face organ against smoothing so as to guarantee accuracy of a face smoothing region, Mask2 enhances a smoothing degree of the nasolabial folds region and the eye bag region to realize the purpose of removing nasolabial folds and eye bags, and Mask3 makes the smoothed five sense organs more stereoscopic through highlight and low light processing. Smoothing of a skin color region is implemented through skin color detection in a non-face region, a region without skin color rejects smoothing, and thus smoothing processing of the whole image is realized.

It can be seen from FIG. 5 that compared with description of some embodiments corresponding to FIG. 2, the flow 500 of the expression transformation method in some embodiments corresponding to FIG. 5 embodies steps of masking processing for the expression transformation image. Accordingly, solutions described in these embodiments guarantee accurate process of different regions of the image. For example, in a scenario of controlling an accuracy and quality of a smoothing effect, the highlight and low light region of the expression transformation image may be more uniform, and an effect of rapidly applying the special effect is achieved.

Figure 6:
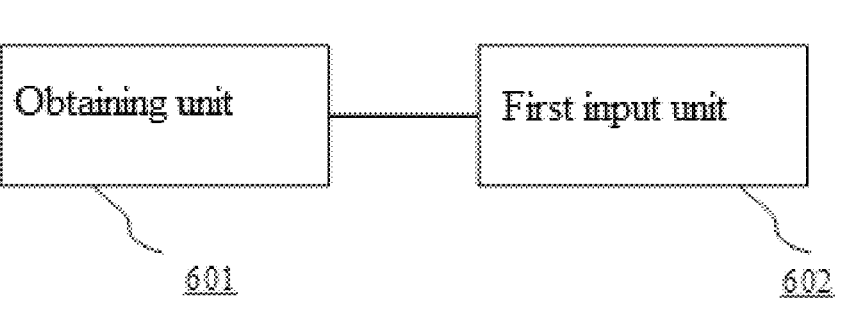
FIG. 6 is a schematic structural diagram of some embodiments of an expression transformation apparatus according to the present disclosure.

Further refer to FIG. 6, as implementations of the above method shown in all figures, the present disclosure provides some embodiments of an expression transformation apparatus, these embodiments of the apparatus correspond to those embodiments of the method shown in FIG. 2, and the apparatus may be specifically applied to various electronic devices.

As shown in FIG. 6, the expression transformation apparatus 600 of some embodiments includes: an obtaining unit 601 and a first input unit 602. The obtaining unit 601 is configured to obtain a target face image. The first input unit 602 is configured to input the above target face image into a preset expression transformation model to obtain an expression transformation image. The expression transformation model is obtained through training by using an original face image set and an image set subjected to local processing and displaying preset expressions.

In optional implementations of some embodiments, the above preset expression transformation model includes any one of the following items: an expression transformation network and an expression transformation grid.

In optional implementations of some embodiments, the above expression transformation apparatus 600 further includes a second input unit. The above second input unit is configured to obtain the expression transformation image in response to inputting the above target face image into the pre-trained expression transformation network. The above expression transformation network is obtained through training by using the original face image set and the image set subjected to local processing and displaying the preset expressions.

In optional implementations of some embodiments, the above expression transformation apparatus 600 further includes a masking unit. The above masking unit is configured to perform masking processing on a target region of the above expression transformation image.

In optional implementations of some embodiments, the above expression transformation apparatus 600 is further configured to obtain the original face image set; input the original face image set and the face image set subjected to local processing and displaying the preset expressions into a preset first generative adversarial network for training to generate the above expression transformation network.

In optional implementations of some embodiments, the above expression transformation apparatus 600 is further configured to perform local processing on face images displaying the preset expressions to obtain face images subjected to local processing and displaying the preset expressions.

In optional implementations of some embodiments, the above expression transformation apparatus 600 is further configured to input the original face images into a pre-trained second generative adversarial network to obtain the above face images displaying the preset expressions.

In optional implementations of some embodiments, the above expression transformation apparatus 600 further includes a third input unit. The above third input unit is configured to obtain the expression transformation image corresponding to the above target face image in response to inputting the above target face image into the preset expression transformation network. The above expression transformation network is obtained through the original face image set and an original face image set subjected to local processing and displaying the preset expressions.

In optional implementations of some embodiments, the above third input unit is further configured to obtain the above original face image set; perform local processing on each original face image displaying the preset expression of the above original face image set so as to obtain the above original face image set subjected to local processing and displaying the preset expressions; and store, in preset grids, the above original face image set and the above original face image set subjected to local processing and displaying the preset expressions so as to generate the expression transformation grid. The above expression transformation grid can represent a one-to-one corresponding relation between the original face images and the expression transformation images corresponding thereto.

It can be understood that all recorded units in the apparatus 600 correspond to all steps in the method described with reference to FIG. 2. Thus, operations, features and brought beneficial effects described above specific to the method are also suitable for the apparatus 600 and the units contained therein, which will not be repeated here.

Figure 7:
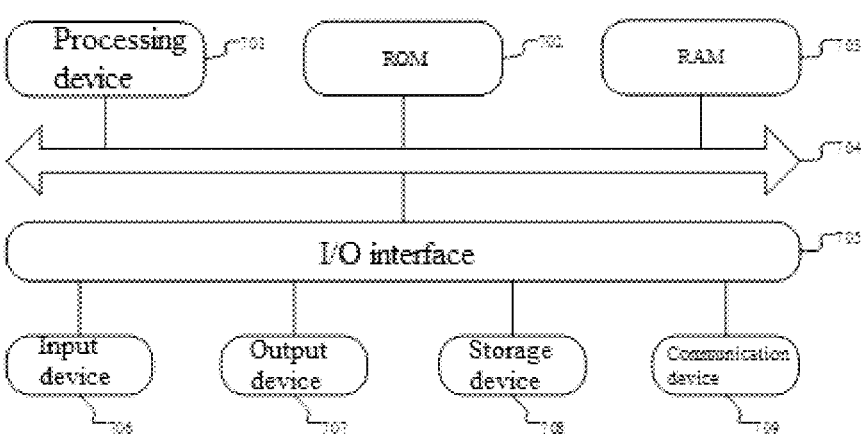
FIG. 7 is a schematic structural diagram of an electronic device suitable for implementing some embodiments of the present disclosure.

Reference is made below to FIG. 7, which illustrates a schematic diagram of the structure of an electronic device (e.g., the computing device of FIG. 1) 700 suitable for use in implementing some embodiments of the present disclosure. Electronic devices in some embodiments of the present disclosure may include, but are not limited to, mobile terminals such as cell phones, laptop computers, digital radio receivers, PDAs (personal digital assistants), PADs (tablet computers), PMPs (portable multimedia players), vehicle terminals (e.g., vehicle navigation terminals), and the like, and fixed terminals such as digital TVs, desktop computers, and the like. The electronic device illustrated in FIG. 7 is only an example and should not impose any limitations on the functionality and scope of use of embodiments of the present disclosure.

As shown in FIG. 7, the electronic device 700 may include a processing device (e.g., central processor, graphics processor, etc.) 701 that may perform various appropriate actions and processes based on a program stored in a read-only memory (ROM) 702 or loaded from a storage device 708 into a random access memory (RAM) 703. In RAM 703, various programs and data required for operation of electronic device 700 are also stored. The processing device 701, ROM 702, and RAM 703 are connected to each other via bus 704. The input/output (I/O) interface 705 is also connected to the bus 704.

Typically, the following devices may be connected to I/O interface 705: input device 706 including, for example, touch screens, touch pads, keyboards, mice, cameras, microphones, accelerometers, gyroscopes, etc.; output device 707 including, for example, liquid crystal displays (LCDs), speakers, vibrators, etc.; storage device 708 including, for example, magnetic tapes, hard drives, etc.; and communication device 709. Communication device 709 may allow the electronic device 700 to communicate wirelessly or wired with other devices to exchange data. While FIG. 7 illustrates the electronic device 700 with various devices, it should be understood that it is not required to implement or have all of the devices illustrated. More or fewer devices may alternatively be implemented or available. Each box illustrated in FIG. 7 may represent one device, or multiple devices as desired.

In particular, according to some embodiments of the present disclosure, the process described above with reference to the flowchart may be implemented as a computer software program. For example, some embodiments of the present disclosure include a computer program product comprising a computer program carried on a computer readable medium, the computer program comprising program code for performing the method shown in the flowchart. In some such embodiments, the computer program may be downloaded and installed from a network via a communication device 709, or from a storage device 708, or from a ROM 702. When this computer program is executed by processing device 701, it performs the above-described functions as defined in the method of some embodiments of the present disclosure.

It is to be noted that the computer readable medium described above in some embodiments of the present disclosure may be a computer readable signal medium or a computer readable storage medium or any combination of the foregoing. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above, magnetic memory devices, or any suitable combination of the foregoing. In some embodiments of the present disclosure, the computer-readable storage medium may be any tangible medium that contains or stores a program that may be used by or in combination with an instruction execution system, device, or device. And in some embodiments of the present disclosure, the computer readable signaling medium may include a data signal propagated in the baseband or as part of a carrier wave carrying a computer readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in conjunction with the instruction execution system, device or device. The program code contained on the computer-readable medium may be transmitted by any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network).

Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above-mentioned computer readable medium may be contained in the above-mentioned computing device; or it may exist separately and is not assembled into the electronic device. The above computer readable medium carries one or more programs which, when executed by the electronic device, cause the electronic device to: acquire a target face image; input said target face image into a pre-set expression transformation model to obtain an expression transformation image wherein said expression transformation model is obtained by means of an original face image set and a locally processed image set showing a predetermined expression is trained. Computer program code for performing the operations of some embodiments of the present disclosure can be written in one or more programming languages or combinations thereof, including object-oriented programming languages—such as Java, Smalltalk, C++, and also conventional procedural programming languages—such as "C". such as "C" language or similar programming languages. The program code may be executed entirely on the user's computer, partially on the user's computer, as a stand-alone package, partially on the user's computer and partially on a remote computer, or entirely on a remote computer or server. In the case involving a remote computer, the remote computer may be connected to the user computer over any kind of network—including a local area network (LAN) or a wide area network (WAN)—or, alternatively, may be connected to an external computer (e.g., using an Internet service provider to connect via the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in some embodiments of the present disclosure may be implemented by means of software or may be implemented by means of hardware. The units described may also be provided in a processor, for example, a processor may be described as comprising a feature acquisition unit, a first input unit For example, the acquisition unit may also be described as "a unit for acquiring a target face image".

The functions described above herein may be performed, at least in part, by one or more hardware logic components. For example, without limitation, exemplary types of hardware logic components that may be used include: field programmable gate arrays (FPGAs), application specific integrated circuits (ASICs), application specific standard products (ASSPs), systems on chip (SOCs), complex programmable logic devices (CPLDs), and the like.

According to one or more embodiments of the present disclosure, provide an expression transformation method, comprising: obtaining a target face image; and inputting the target face image into a preset expression transformation model to obtain an expression transformation image, wherein the expression transformation model is obtained through training by using an original face image set and an image set subjected to local processing and displaying preset expressions. According to one or more embodiments of the present disclosure, the above preset expression transformation model comprises any one of the followings: an expression transformation network and an expression transformation grid.

According to one or more embodiments of the present disclosure, obtaining the expression transformation image in response to inputting the target face image into the pre-trained expression transformation network, wherein the expression transformation network is obtained through training by using the original face image set and the image set subjected to local processing and displaying the preset expressions.

According to one or more embodiments of the present disclosure, performing masking processing on a target region of the above expression transformation image.

According to one or more embodiments of the present disclosure, obtaining the original face image set; and inputting the original face image set and a face image set subjected to local processing and displaying preset expressions into a preset first generative adversarial network for training to generate the expression transformation network.

According to one or more embodiments of the present disclosure, performing local processing on face images displaying the preset expressions to obtain the face images subjected to local processing and displaying the preset expressions.

According to one or more embodiments of the present disclosure, inputting original face images in the original face image set into a pre-trained second generative adversarial network to obtain the face images displaying the preset expressions.

According to one or more embodiments of the present disclosure, obtaining the expression transformation image corresponding to the target face image in response to inputting the target face image into the preset expression transformation grid, wherein the expression transformation grid is obtained through the original face image set and an original face image set subjected to local processing and displaying preset expressions.

According to one or more embodiments of the present disclosure, obtaining the original face image set; performing local processing on each original face image displaying the preset expression of the original face image set to obtain the original face image set subjected to local processing and displaying the preset expressions; and storing, in preset grids, the original face image set and the original face image set subjected to local processing and displaying the preset expressions to generate the expression transformation grid, wherein the expression transformation grid can represent a one-to-one corresponding relation between original face images and the expression transformation images corresponding thereto.

According to one or more embodiments of the present disclosure, provide an expression transformation apparatus, comprising: an obtaining unit, configured to obtain a target face image; and a first input unit, configured to input the target face image into a preset expression transformation model to obtain an expression transformation image, wherein the expression transformation model is obtained through training by using an original face image set and an image set subjected to local processing and displaying preset expressions. According to one or more embodiments of the present disclosure, the above preset expression transformation model includes any one of the following items: an expression transformation network and an expression transformation grid.

According to one or more embodiments of the present disclosure, the above expression transformation apparatus further includes a second input unit. The above second input unit is configured to obtain the expression transformation image in response to inputting the above target face image into the pre-trained expression transformation network. The above expression transformation network is obtained through training by using the original face image set and the image set subjected to local processing and displaying the preset expressions.

According to one or more embodiments of the present disclosure, the above expression transformation apparatus further includes a masking unit. The above masking unit is configured to perform masking processing on a target region of the above expression transformation image.

According to one or more embodiments of the present disclosure, the above expression transformation apparatus is further configured to obtain the original face image set; input the original face image set and the face image set subjected to local processing and displaying the preset expressions into a preset first generative adversarial network for training to generate the above expression transformation network.

According to one or more embodiments of the present disclosure, the above expression transformation apparatus is further configured to perform local processing on face images displaying the preset expressions to obtain face images subjected to local processing and displaying the preset expressions.

According to one or more embodiments of the present disclosure, the above expression transformation apparatus is further configured to input the original face images into a pre-trained second generative adversarial network to obtain the above face images displaying the preset expressions.

According to one or more embodiments of the present disclosure, the above expression transformation apparatus further includes a third input unit. The above third input unit is configured to obtain the expression transformation image corresponding to the above target face image in response to inputting the above target face image into the preset expression transformation network. The above expression transformation network is obtained through the original face image set and an original face image set subjected to local processing and displaying the preset expressions.

According to one or more embodiments of the present disclosure, the above third input unit is further configured to obtain the above original face image set; perform local processing on each original face image displaying the preset expression of the above original face image set so as to obtain the above original face image set subjected to local processing and displaying the preset expressions; and store, in preset grids, the above original face image set and the above original face image set subjected to local processing and displaying the preset expressions so as to generate the above expression transformation grid. The above expression transformation grid can represent a one-to-one corresponding relation between the original face images and the expression transformation images corresponding thereto.

According to one or more embodiments of the present disclosure, provide an electronic device, comprising: one or more processors; and a storage apparatus, storing one or more programs, wherein the one or more programs, when executed by the one or more processors, cause the one or more processors to implement the method as described in any of the implementations of the first aspect.

According to one or more embodiments of the present disclosure, provide a computer readable medium, storing a computer program, wherein the program, when executed by a processor, implements the method as described in any of the implementations of the first aspect.

The above description is only a description of some preferred embodiments of the present disclosure and of the technical principles applied. It should be understood by those skilled in the art that the scope of the invention covered by the embodiments of the present disclosure is not limited to technical solutions resulting from a particular combination of the above technical features, but should also cover other technical solutions resulting from any combination of the above technical features or their equivalent features without departing from the above inventive concept. For example, the above features are interchangeable with (but not limited to) technical features with similar functions disclosed in the embodiments of the present disclosure.

What is claimed is:

1. An expression transformation method, comprising:
   obtaining a target face image;
   inputting the target face image into an expression transformation model,
   wherein the expression transformation model is pre-trained using an original face image set and an image set subjected to local processing and displaying preset expressions, and
   wherein the image set subjected to local processing and displaying preset expressions for training the expression transformation model is obtained by performing local processing on particular regions of face images that present the preset expressions, and wherein the local processing performed on the particular regions of face images comprises image super-resolution processing and local whitening super-resolution processing; and
   generating an expression transformation image by the expression transformation model performing expression transformation on the target face image, wherein the expression transformation image comprises a particular expression with an added effect, and wherein the added effect comprises beaming, whitened teeth, or colored hair.

2. The method according to claim 1, wherein after inputting the target face image into the pre-trained expression transformation model to obtain the expression transformation image, the method further comprises:
   performing a masking processing on a target region of the expression transformation image to obtain an expression transformation image after the masking processing.

3. The method according to claim 1, wherein the expression transformation model comprises at least one of an expression transformation network or an expression transformation grid.

4. The method according to claim 3, further comprising:

obtaining the expression transformation image in response to inputting the target face image into the expression transformation network, wherein the expression transformation network is obtained through training by using the original face image set and the image set subjected to local processing and displaying the preset expressions.

5. The method according to claim 4, wherein the expression transformation network is obtained through training through the following steps:

obtaining the original face image set; and inputting the original face image set and the image set subjected to local processing and displaying preset expressions into a preset first generative adversarial network for training to generate the expression transformation network.

6. The method according to claim 1, wherein the face images that present the preset expressions are obtained through:

inputting original face images in the original face image set into a pre-trained second generative adversarial network to obtain the face images that present the preset expressions.

7. The method according to claim 3, further comprising:

obtaining the expression transformation image corresponding to the target face image in response to inputting the target face image into the expression transformation grid, wherein the expression transformation grid is obtained through the original face image set and an original face image set subjected to local processing and displaying preset expressions.

8. The method according to claim 3, wherein the expression transformation grid is obtained through the following steps:

obtaining the original face image set;

performing local processing on each original face image that presents the preset expressions to obtain the image set subjected to local processing and displaying the preset expressions; and storing, in preset grids, the original face image set and the face image set subjected to local processing and displaying the preset expressions to generate the expression transformation grid, wherein the expression transformation grid can represent a one-to-one corresponding relation between original face images and the expression transformation images corresponding thereto.

9. An electronic device, comprising:

one or more processors; and a storage apparatus, storing one or more programs, wherein the one or more programs, when executed by the one or more processors, cause the one or more processors to implement operations comprising:

obtaining a target face image;

inputting the target face image into an expression transformation model, wherein the expression transformation model is pretrained using an original face image set and an image set subjected to local processing and displaying preset expressions, and wherein the image set subjected to local processing and displaying preset expressions for training the expression transformation model is obtained by performing local processing on particular regions of face images that present the preset expressions, and wherein the local processing performed on the particular regions of face images comprises image super-resolution processing and local whitening super-resolution processing; and generating an expression transformation image by the expression transformation model performing expression transformation on the target face image, wherein the expression transformation image comprises a particular expression with an added effect, and wherein the added effect comprises beaming, whitened teeth, or colored hair.

10. A non-transitory computer readable medium, storing a computer program, wherein the program, when executed by a processor, implements operations comprising:

obtaining a target face image;

inputting the target face image into an expression transformation model, wherein the expression transformation model is pretrained using an original face image set and an image set subjected to local processing and displaying preset expressions, and wherein the image set subjected to local processing and displaying preset expressions for training the expression transformation model is obtained by performing local processing on particular regions of face images that present the preset expressions, and wherein the local processing performed on the particular regions of face images comprises image super-resolution processing and local whitening super-resolution processing; and generating an expression transformation image by the expression transformation model performing expression transformation on the target face image, wherein the expression transformation image comprises a particular expression with an added effect, and wherein the added effect comprises beaming, whitened teeth, or colored hair.

11. The electronic device according to claim 9, wherein after inputting the target face image into the pre-trained expression transformation model to obtain the expression transformation image, the operations further comprise:

performing a masking processing on a target region of the expression transformation image to obtain an expression transformation image after the masking processing.

12. The electronic device according to claim 9, wherein the expression transformation model comprises at least one of an expression transformation network or an expression transformation grid.

13. The electronic device according to claim 12, the operations further comprising:

obtaining the expression transformation image in response to inputting the target face image into the expression transformation network, wherein the expression transformation network is obtained through training by using the original face image set and the image set subjected to local processing and displaying the preset expressions.

14. The electronic device according to claim 13, wherein the expression transformation network is obtained through training through operations of:

obtaining the original face image set; and inputting the original face image set and the image set subjected to local processing and displaying preset expressions into a preset first generative adversarial network for training to generate the expression transformation network.

15. The electronic device according to claim 9, wherein the face images that present the preset expressions are obtained through:

inputting original face images in the original face image set into a pre-trained second generative adversarial network to obtain the face images that present the preset expressions.

16. The electronic device according to claim 12, the operations further comprising:

obtaining the expression transformation image corresponding to the target face image in response to inputting the target face image into the expression transformation grid, wherein the expression transformation grid is obtained through the original face image set and the face image set subjected to local processing and displaying preset expressions.

17. The electronic device according to claim 12, wherein the expression transformation grid is obtained through operations of:

obtaining the original face image set;

performing local processing on each original face image that presents the preset expressions to obtain the image set subjected to local processing and displaying the preset expressions; and storing, in preset grids, the original face image set and the face image set subjected to local processing and displaying the preset expressions to generate the expression transformation grid, wherein the expression transformation grid can represent a one-to-one corresponding relation between original face images and the expression transformation images corresponding thereto.

\* \* \* \* \*